R. F. HOFFMAN.
STEERING MECHANISM.
APPLICATION FILED JAN. 3, 1920.
1,378,456.
Patented May 17, 1921.
3 SHEETS—SHEET 3.
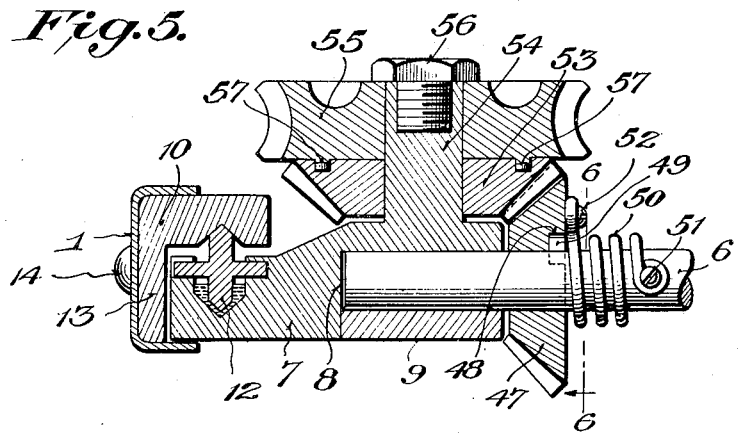
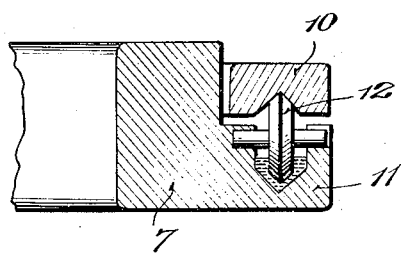
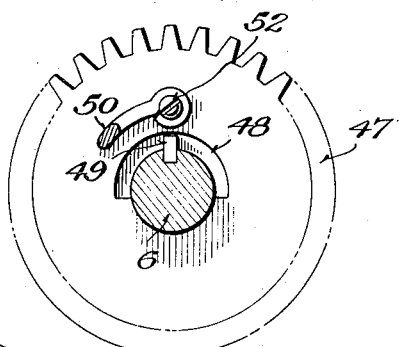
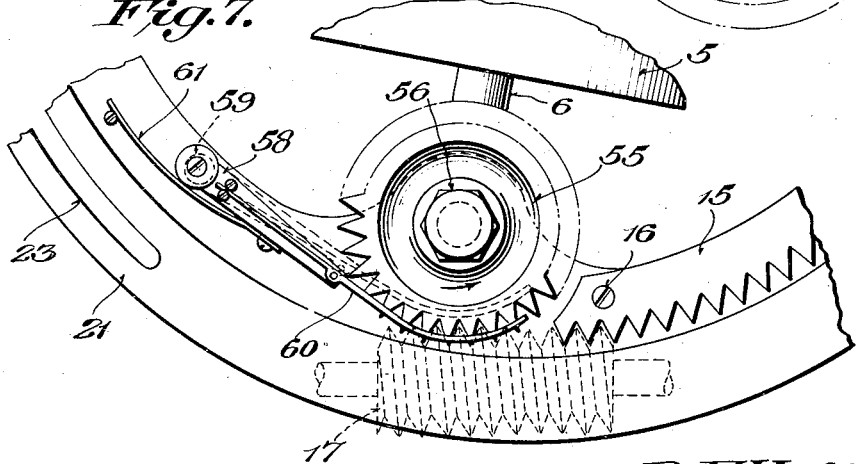
Inventor
R. F. Hoffman,

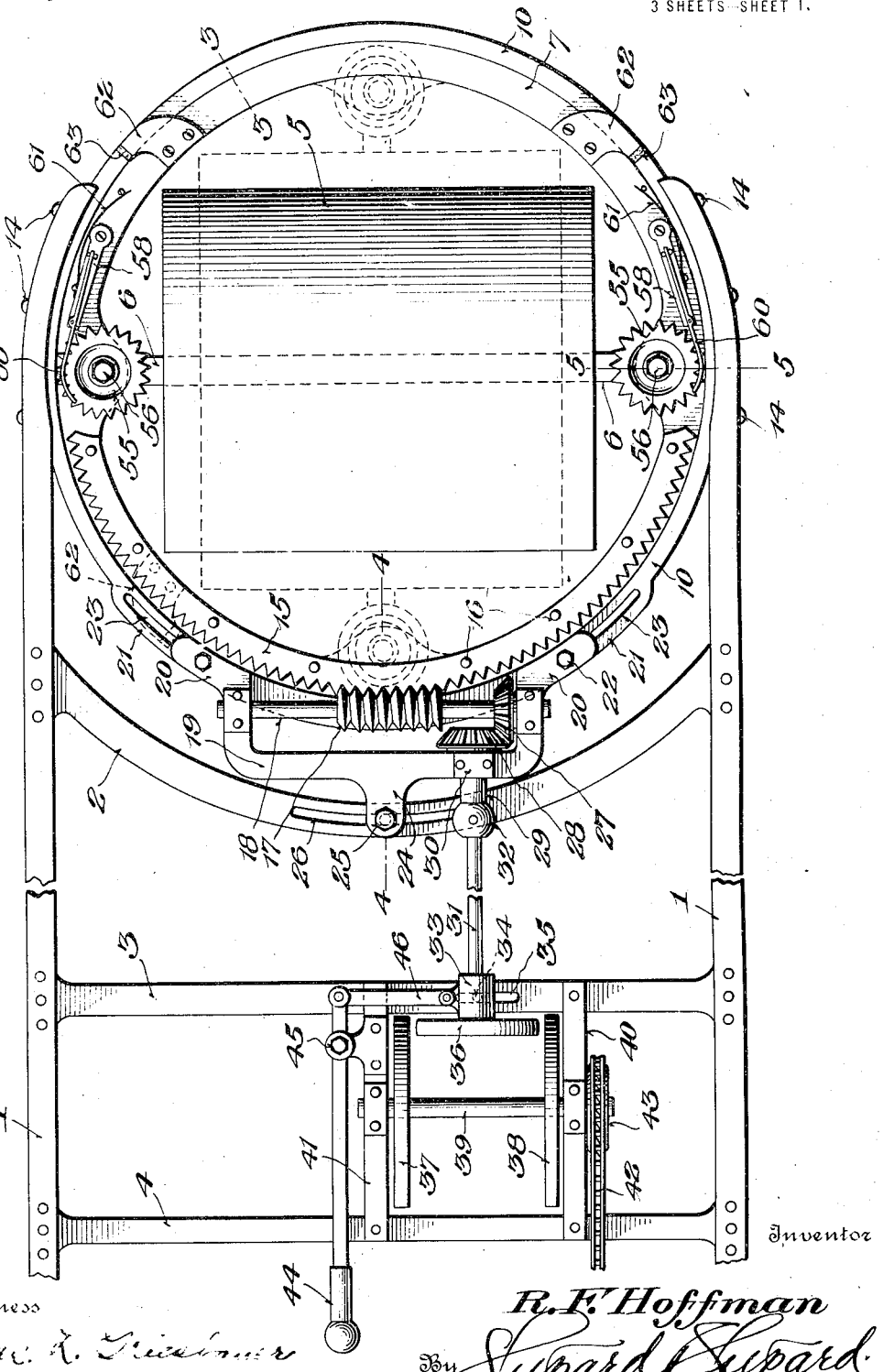

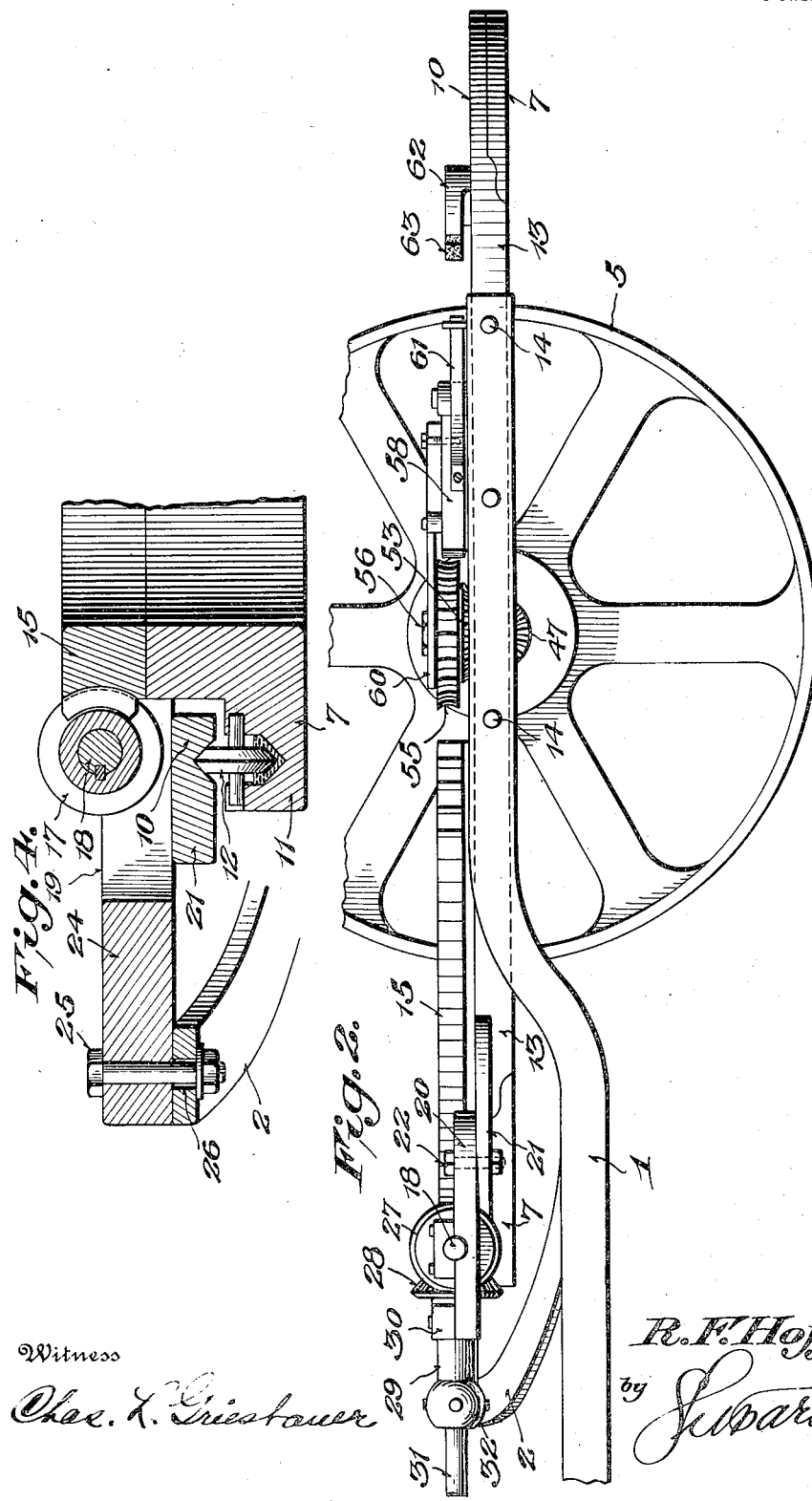

UNITED STATES PATENT OFFICE.

REUBEN F. HOFFMAN, OF HAMILTON, OHIO.

STEERING MECHANISM.

1,378,456. Specification of Letters Patent. Patented May 17, 1921.

Application filed January 3, 1920. Serial No. 349,284.

*To all whom it may concern:*

Be it known that I, REUBEN F. HOFFMAN, a citizen of the United States, residing at Hamilton, in the county of Butler and State of Ohio, have invented new and useful Improvements in Steering Mechanisms, of which the following is aspecification.

This invention relates to power actuated steering mechanism for tractors, agricultural machines and other vehicles, and has for its object to provide certain new and useful improvements as will be hereinafter more fully described, illustrated in the accompanying drawings and particularly pointed out in the appended claims, it of course being understood that changes in the form, proportion, size and minor details may be made, within the scope of the claims, without departing from the spirit or sacrificing any of the advantages of the invention.

In the drawings:

Figure 1 is a plan view of a power steering mechanism embodying the feature of the present invention.

Fig. 2 is a side elevation of the front portion of Fig. 1.

Fig. 3 is a sectional view on the line 3—3 of Fig. 1.

Fig. 4 is a detail cross sectional view on the line 4—4 of Fig. 1.

Fig. 5 is an enlarged detail sectional view on the line 5—5 of Fig. 1.

Fig. 6 is a detail sectional view on the line 6—6 of Fig. 5.

Fig. 7 is an enlarged fragmentary plan view showing the position of parts for driving the steering ground wheel.

Inasmuch as the present invention is applicable to tractors, agricultural machines and other power driven vehicles or the like, the illustration in the accompanying drawings has been restricted to the essentials of the invention, without regard to the specific character of the machine to which the invention is applied, only so much of the main frame of the machine being shown as is necessary for the mounting of the present invention. As embodied in the present drawings, the main frame includes longitudinal side bars 1, each of which is a channel bar, as best shown in Fig. 5, and said side bars are connected by suitable cross bars which have been designated 2, 3 and 4. The front cross bar 2 is located a suitable distance in rear of the forward ends of the side bars 1 and is bowed or arcuate in its longitudinal direction. The space bounded by the front cross bar 2 and the side bar portions in front of said cross bar accommodates the steering ground wheel 5, which wheel may be in the form of a drum, as shown in Fig. 1, and is normally idle *i. e.* is not normally power driven and therefore is not normally a traction wheel. However, the wheel may be power driven under certain conditions to assist in turning the machine sharply to the right or left as will hereinafter appear.

The steering wheel 5 is suitably fixed upon a rotatable shaft 6, and each end of this shaft is rotatably mounted upon a ring 7 which is in the nature of a fifth wheel capable of being turned about its vertical center as an axis when turning the wheel for steering purposes. As clearly shown in Fig. 1, it will be seen that the shaft or axle 6 is disposed diametrically with respect to the fifth wheel 7 and may be rotatably mounted upon the fifth wheel in any suitable manner, as for instance by the provision of a seat or recess 8 in the bottom of the fifth wheel 7 and intersecting the inner periphery thereof, the adjacent end of the shaft or axle being received within the seat or recess and retained therein by means of a suitable bearing bracket 9 underlying the axle and suitably secured to the fifth wheel.

It will be understood that the steering ground wheel 5 supports the fifth wheel 7 and the main frame is supported upon the fifth wheel by means of a hanger member 10 in the form of a ring which is superposed upon the fifth wheel 7 and received within a seat defined by a horizontal external flange 11 projecting from the bottom of the fifth wheel 7. Suitable anti-friction devices 12 are interposed between the fifth wheel 7 and the ring frame 10. The ring frame 10 is provided with a depending flange 13 extending downwardly at the outer side of the flange 11 and is received within the adjacent channel frame bar 1, to which it is rigidly secured by suitable fastenings 14. It will of course be understood that there is one such flange 13 for each longitudinal side bar 1, and said flange extending only part way around the ring frame 10, as will be clearly understood by reference to Fig. 2 of the drawings. In rear of the shaft or axle 6 there is an arcuate rack bar 15 which is suitably secured upon the top of the fifth wheel 7, as by fastenings 16, said rack of course being concentric with the fifth wheel. Power is applied to this rack, as will be hereinafter explained for the purpose of rotating the fifth wheel 7 about its vertical axis and beneath the stationary ring frame 10, whereby steering movements may be imparted to the steering ground wheel 5. It will now be understood that the fifth wheel 7 has a swiveled mounting with respect to the ring frame 10 and the main frame of the machine.

In mesh with the rack 15 is a worm 17 carried by a horizontal shaft 18 disposed transversely of the machine and having its ends rotatably mounted in a forked or U-shaped bracket 19. Each leg of the bracket 19 is provided with a foot portion 20 resting upon a horizontal flange or extension 21 on the stationary ring frame 10, and adjustably secured thereto by means of a suitable fastening 22 passing through a slot 23 in the stationary ring portion 21. At the middle of the bracket 19 and extending rearwardly therefrom is an arm 24 overlying and resting upon the front cross bar 2 and secured thereto by means of a suitable fastening 25 extending through a slot 26 in the cross bar 2. The slots 23 and 26 are arcuate in order that the bracket 19 may be set in different adjusted positions around the stationary ring frame 10 within the limits of said slots, for a purpose as will hereinafter appear.

On one end portion of the worm shaft 18 there is a beveled gear 27 in mesh with the beveled gear 28 upon a stub shaft 29 mounted in a suitable bearing 30 upon the bracket 19, said shaft 29 being disposed at right angles to the shaft 18. A countershaft 31 is in alinement with the stub shaft 29 and is connected thereto by a universal joint 32. The rear end of the counter shaft 31 is mounted in a bearing 33, mounted upon the cross bar 3 and capable of sliding along the length of said cross bar. For the slidable mounting of the bearing 33, the latter is provided with a depending headed stud 34 indicated in dotted lines in Fig. 1, and said stud is slidably received in a slot or slideway 35 on the cross bar 3. A friction wheel 36 is carried by the rear end of the countershaft 31 and disposed in rear of the cross bar 3, and also located between friction disks 37 and 38 carried by a shaft 39 mounted in suitable brackets upon bars 40 and 41 extending between the cross bars 3 and 4. The shaft 39 is driven in any suitable manner from any suitable source of power on the machine, as for instance by means of a drive chain 42, extending from a source of power and engaging a sprocket wheel 43 on one end of the shaft 39. It will now be understood that the countershaft 31 may be driven in either direction by shifting the friction wheel 36 into engagement with one or the other of the friction disks 37 and 38. For convenience in shifting the friction wheel 36 there is a hand lever 44 fulcrumed as at 45 and connected to the slidable bearing 33 by a link 46.

As thus far decribed, it will be understood that when the friction wheel 36 is out of engagement with the friction disks 37 and 38, the countershaft 31 is idle and therefore the worm 17 is also idle. The worm 17 being idle and in mesh with the rack 15, the fifth wheel 7 is locked against circumferential movement and consequently the steering ground wheel 5 is locked against steering movements, but of course is capable of rotating on its axle so as not to interfere with the travel of the machine. By manipulation of the lever 44, the friction wheel 36 may be moved into engagement with either of the driving disks 37 and 38, and thereby rotation will be imparted to the worm 17 which will result in the rotation of the rack 15 and the fifth wheel 7 which is supported upon the axle 6, and consequently the latter and its ground wheel 5 will be turned either to the right or to the left for steering purposes. As soon as the steering wheel 5 has been given the desired angular adjustment, the friction wheel 36 is brought to an intermediate position out of engagement with the friction wheels 37 and 38 for the purpose of avoiding further angular movement of the wheel and for the further purpose of locking the ground wheel in its adjusted position. It will now be understood that the machine may be conveniently steered by the manipulation of the hand lever 44, and that the power for steering purposes may be quickly and satisfactorily applied and removed. Moreover it will be noted that with the exception of the clutch, produced by the friction disks 36, 37 and 38, the driving parts are normally in mesh, and therefore the fifth wheel 7 and the steering ground wheel are normally locked against angular or steering movements, thereby obviating the necessity of separate locking or latching mechanism, and thus permitting steering adjustment of the ground wheel 5 by the hand manipulation of a single controlling device which is the hand lever 44.

As hereinbefore set forth, it is an important object of the present invention to positively drive the steering wheel 5 for traction purposes when turning sharply to the right or to the left, and this advantageous feature is accomplished in the following manner. On each end portion of the axle 6 of the ground wheel 5 there is a beveled gear 47, best shown in Fig. 5 of the drawings. This gear has a limited rotation upon the axle 6 through the instrumentality of an arcuate slot or channel 48 in the gear and receiving a key 49 projecting radially from the axle. Normally the key 49 is midway between the ends of the slot or channel 48, and said ends constitute abutments for engagement with the key 49 to limit the independent rotation of the gear upon the axle and thereafter insure simultaneous rotation of the gear and axle. A coiled spring 50 surrounds the axle and has one end connected thereto as at 51 and its other end connected to the adjacent face of the gear as at 52. The purpose of this spring is to yieldingly maintain the gear 47 in such a rotative position upon the axle 6 as to bring the key 49 midway between the shoulders or abutments formed by the ends of the slot or channel 48. The gear 47 is in mesh with a gear 53 rotatable upon a stub shaft 54 rising from the fifth wheel 7. There is also a worm gear 55 rotatable upon the post or stub shaft 5 and held thereon by a cap or headed screw 56. The gears 53 and 55 rotate together and may be connected in any suitable manner, as for instance by means of the pin and socket connections 57. It will of course be understood that inasmuch as the gears 55, 53 and 47 are successively connected they rotate simultaneously with the axle 6 of the ground wheel 5.

When the steering ground wheel 5 has been turned through ninety degrees to the position shown in Fig. 7 of the drawings, it will be seen that the arcuate rack 15 will have moved to a position out of engagement with the worm 17, and one of the worm wheels 55 would have come into mesh with the worm 17, and consequently the steering ground wheel 5 will be positively rotated so as to give the same tractive power to assist in turning the machine sharply to the right or left as the case may be.

Locking means coöperate with the worm or driven gears 55 to prevent backward rotation thereof so that when reversing the worm or power driven gear 17 the part 7 will be moved sufficiently to insure the part 17 engaging the teeth of the rack 15. The locking means consist of dogs 58, one for each driven gear 55, pivoted to the fifth wheel 7 at 59. An elastically yieldable bowed or arcuate arm 60 is provided upon the dog 58 and has its forward free end portion overlying the toothed portion of the worm gear 55 and in position to engage the worm 17 and be pressed inwardly thereby so as to bring the free end of the dog 58 into engagement with the teeth of the gear 55. Normally, a spring 61 holds the dog out of engagement with the teeth of the gear 55 so as not to interfere with the free rotation of the gear when the latter is out of engagement with the worm 17. When the dog is forced into engagement with the teeth of the worm gear 55, the dog thereafter operates as a ratchet, in a manner as will be readily understood, permitting rotation of the gear 55 in the direction of the arrow, but preventing rotation of the gear in the opposite direction, wherefore the gear 55 and the steering ground wheel 5 will be positively driven from the worm 17 in one direction, and backward rotation of the gear 55 and the ground wheel 5 are effectually prevented.

It will now be explained that when the gear 55 starts to rotate, the gear 47 will first turn loosely upon the axle 6 against the tension of the spring 50 until the abutment at one end of the channel 48 engages the key 49, whereupon the axle 6 and the steering ground wheel will begin to rotate. The spring cushions the driving effect of the gear 47, and therefore traction movement is imparted to the steering ground wheel 5 in a smooth and satisfactory manner, because the gear 47 and the spring 50 constitute compensating means to cushion the impact of the driving engagement between the gear 47 and the key 49 on the axle 6. The pivotal mounting of the ratchet dog 58 has an eccentric adjustment as indicated by dotted lines in Fig. 7 in order that the dog may be adjusted to the gear 55 to compensate for wear and looseness.

Accurate stopping of the rotation of the fifth wheel 7 when the worm gear 55 has come into proper engagement with the worm 17 is obtained by means of two stops 62 in the form of upstanding abutments provided upon the top of the fifth wheel 7 and positioned for engagement with the respective ends of the bracket 19, as indicated in Fig. 1 of the drawings, when the adjacent gear 55 has properly engaged the worm 17. Each stop 62 has its upstanding abutment portion provided with a yieldable facing 63, preferably a block of felt or similar material so as to prevent jarring and rebounding of the fifth wheel when the stop contacts with the bracket 19. The slots 23 and 26 are provided for the purpose of adjusting the bracket 19 so as to bring the worm 17 into proper relation with respect to the length of the rack bar 15, which rack bar is less than a semi-circle in order that the respective gears 55 may come into engagement with the worm 17.

What I claim is:

1. A steering ground wheel, a steering member for the ground wheel, ground wheel drive means, and a power driven member normally engaging the said steering member and adapted to clear the same and engage the said ground wheel drive means.

2. A steering ground wheel, a steering member, a power driven member normally in engagement with the steering member and adapted to clear the same when the steering wheel has moved a predetermined distance in either direction, and means automatically engageable by the said power driven member when clearing the steering member to positively drive the steering wheel.

3. A steering ground wheel, a power driven member, a steering member normally in contact with the power driven member to admit of steering within certain limits and independent drive means adapted to be automatically engaged by the said power driven member when the latter clears the said steering member to impart a positive driving movement to the steering ground wheel.

4. A steering ground wheel, spaced power transmitting elements operatively connected with the ground wheel, a power driven member, and a steering element movable with the ground wheel for transmitting steering movement thereto and normally in gear with the said power driven member to be operated thereby within certain limits of steering, the said power transmititng elements being relatively disposed to admit of one or the other being engaged by the said power driven member for imparting a driving movement to the ground wheel when the steering element is clear of the power driven member.

5. A steering ground wheel, spaced power transmitting elements operatively connected with the ground wheel, a power driven member, and a steering rack disposed between the power transmitting elements and movable with the ground wheel and normally in gear with the power driven member, the latter when clearing the rack at the limit of the steering movement engaging one or the other of said power transmitting elements to impart a driving movement to the ground wheel.

6. The combination with a swiveled steering ground wheel, of power-actuated means for imparting steering movements to the wheel, and a drive connection associated with the ground wheel and movable therewith during steering movements thereof, said driving connection being in driving engagement with an element of the power-actuated means when the steering wheel has been set to a predetermined steering angle.

7. A steering ground wheel, an arcuate rack movable with the ground wheel and concentric with the steering axis thereof, worm gears adjacent the ends of the rack and operatively connected with the ground wheel to impart driving movement thereto, and a power driving worm normally in mesh with the rack for imparting steering movement to the ground wheel and adapted to clear the rack and engage with one or the other of the said worm gears and positively drive the ground wheel.

8. The combination of a steering ground wheel, a fifth wheel therefor, a frame upon which the fifth wheel is swiveled, an arcuate rack carried by the fifth wheel and lying entirely at one side of the axis of the wheel, power-actuated means including a worm engaging the rack, and a drive connection at each end of the ground wheel, said connections being respectively in engagement with the worm when the fifth wheel has been turned ninety degrees from normal and the rack disengaged from the worm.

9. The combination of a steering ground wheel, a fifth wheel therefor, a frame upon which the fifth wheel is swiveled, an arcuate rack carried by the fifth wheel and lying entirely at one side of the axis of the wheel, power-actuated means including a worm engaging the rack, a drive connection at each end of the ground wheel, said connections being respectively in engagement with the worm when the fifth wheel has been turned ninety degrees from normal and the rack disengaged from the worm and means for stopping the rotation of the fifth wheel when either drive connection is in engagement with the worm.

10. The combination of a steering ground wheel, a fifth wheel therefor, a frame upon which the fifth wheel is swiveled, an arcuate rack carried by the fifth wheel, power-actuated means including a bracket carrying a driving gear in mesh with the rack, a drive connection at each end of the ground wheel, the fifth wheel capable of being turned to bring either one of the drive connections into engagement with the gear, and stops provided upon the fifth wheel, the bracket being in the paths of the stops to limit the rotation of the fifth wheel.

11. A steering ground wheel, an arcuate rack movable with the ground wheel and concentric with the steering axis thereof, gears adjacent the ends of the rack and operatively connected with the ground wheel to impart driving movement thereto, a gear member normally in mesh with the rack to impart steering movement to the ground wheel, and adapted to engage one or the other of the said gears when clearing the ends of the rack to impart driving movement to the steering wheel and power transmitting means including a reversing mechanism for actuating the said gear member 12. The combination of a steering ground wheel, a fifth wheel therefor, a frame upon which the fifth wheel is swiveled, an arcuate rack carried by the fifth wheel, drive means for the steering wheel member on the fifth wheel at the ends of the said rack, a gear in mesh with the rack and adapted to engage either one of the drive means, a pair of driving disks, a friction wheel between and shiftable into engagement with either of the driving disks, and a drive connection between the friction wheel and the gear.

13. The combination of a steering ground wheel, a fifth wheel therefor, a frame upon which the fifth wheel is swiveled, an arcuate rack carried by the fifth wheel, power-actuated means including a gear in mesh with the rack for rotating the fifth wheel, and meshed gears at each end of the ground wheel for imparting traction movement thereto, one of the gears at each end of the wheel being in engagement with the gear of the power-actuated means in a predetermined angular adjustment of the steering wheel to transfer power from said gear to the steering wheel.

14. The combination of a steering ground wheel, a fifth wheel therefor, a frame upon which the fifth wheel is swiveled, an arcuate rack carried by the fifth wheel, power-actuated means including a gear in mesh with the rack for rotating the fifth wheel, and meshed gears at each end of the ground wheel for imparting traction movement thereto, one of the gears at each end of the wheel being in engagement with the gear of the power-actuated means in a predetermined angular adjustment of the steering wheel to transfer power from said gear to the steering wheel, the gear at each end of the traction wheel having an elastically yieldable driving connection therewith.

15. The combination of a steering ground wheel, a fifth wheel therefor, a frame upon which the fifth wheel is swiveled, an arcuate rack carried by the fifth wheel, power-actuated means including a gear in mesh with the rack for rotating the fifth wheel, and meshed gears at each end of the ground wheel for imparting traction movement thereto, one of the gears at each end of the wheel being in engagement with the gear of the power-actuated means in a predetermined angular adjustment of the steering wheel to transfer power from said gear to the steering wheel, the gear at each end of the steering wheel having a limited rotation independent of the steering wheel, and a spring normally maintaining the gear at the mid position of its independent rotative movement.

16. The combination of a steering ground wheel having an axle, a fifth wheel, the axle being rotatively mounted upon the fifth wheel, a frame upon which the fifth wheel is swiveled, an arcuate rack upon the fifth wheel, power-actuated mechanism including a driving gear in mesh with the rack, the fifth wheel capable of rotation to disengage the rack from the gear, meshed gears mounted respectively upon the axle and the fifth wheel, a third gear associated with the gear on the fifth wheel and capable of engagement with the driving gear in a predetermined angular adjustment of the steering wheel to impart traction movement thereto.

17. The combination of a steering ground wheel having an axle, a fifth wheel, the axle being rotatively mounted upon the fifth wheel, a frame upon which the fifth wheel is swiveled, an arcuate rack upon the fifth wheel, power-actuated mechanism including a driving gear in mesh with the rack, the fifth wheel capable of rotation to disengage the rack from the gear, meshed gears mounted respectively upon the axle and the fifth wheel, a third gear associated with the gear on the fifth wheel and capable of engagement with the driving gear in a predetermined angular adjustment of the steering wheel to impart traction movement thereto, the gear on the axle having a limited rotation thereon, and a coil spring embracing the axle and connected at opposite ends to said gear and axle respectively.

18. The combination of a steering ground wheel, a fifth wheel therefor, a frame upon which the fifth wheel is swiveled, an arcuate rack carried by the fifth wheel, power actuated means including a driving gear engaging the rack, a drive connection for the ground wheel, said connection being mounted upon the fifth wheel and including a gear capable of driving engagement with the driving gear in a predetermined angular adjustment of the ground wheel, and ratchet mechanism for the gear of the drive connection, said ratchet including means to normally hold it out of engagement with the gear of the drive connection, and means for yieldably bringing the ratchet into engagement with the gear of the drive connection when the latter is in engagement with the driving gear.

19. The combination of a steering ground wheel, a fifth wheel therefor, a frame upon which the fifth wheel is swiveled, an arcuate rack carried by the fifth wheel, power actuated means including a driving gear in engagement with the rack, a drive connection for the ground wheel, said connection being mounted upon the fifth wheel and including a gear capable of driving engagement with the driving gear in a predetermined angular adjustment of the ground wheel, and ratchet mechanism for the gear on the fifth wheel, said ratchet mechanism including a pivoted dog normally spring pressed out of engagement with the gear and carrying an elastically yieldable arm in position for engagement with the driving gear to move the dog into engagement with the gear on the wheel.

20. A steering ground wheel, an arcuate rack movable with the ground wheel and concentric with the steering axis thereof, gears adjacent the ends of the rack and opperatively connected with the ground wheel to impart driving movement thereto, a power driven gear normally in mesh with the rack for imparting steering movement to the ground wheel and adapted to clear the rack and engage with one or the other of the said gears at the ends of the rack, and locking means in coöperative relation with the said gears and adapted to be thrown into action when the power driven gear is in engagement with one or the other thereof to prevent backward movement when reversing the said power driven gear.

REUBEN F. HOFFMAN.